(12) United States Patent
Abeille et al.

(10) Patent No.: US 10,390,286 B2
(45) Date of Patent: Aug. 20, 2019

(54) METHOD FOR PERFORMING ROUTE OPTIMIZATION BETWEEN TWO NODES IN NETWORK BASED MOBILITY MANAGEMENT

(75) Inventors: Julien Abeille, Saint Medard en Jalles (FR); Marco Liebsch, Heidelberg (DE); Telemaco Melia, Heidelberg (DE)

(73) Assignee: NEC CORPORATION, Tokyo (JP)

(*) Notice: Subject to any disclaimer, the term of this patent is extended or adjusted under 35 U.S.C. 154(b) by 1651 days.

(21) Appl. No.: 12/531,221

(22) PCT Filed: Mar. 12, 2008

(86) PCT No.: PCT/EP2008/001985
§ 371 (c)(1),
(2), (4) Date: Feb. 10, 2010

(87) PCT Pub. No.: WO2008/110359
PCT Pub. Date: Sep. 18, 2008

(65) Prior Publication Data
US 2010/0177686 A1 Jul. 15, 2010

(30) Foreign Application Priority Data
Mar. 12, 2007 (EP) .................................. 07005052

(51) Int. Cl.
*H04W 40/36* (2009.01)
*H04W 80/04* (2009.01)
(Continued)

(52) U.S. Cl.
CPC ............ *H04W 40/36* (2013.01); *H04W 8/082* (2013.01); *H04W 8/12* (2013.01); *H04W 80/04* (2013.01)

(58) Field of Classification Search
CPC ..... H04W 40/36; H04W 80/04; H04W 8/082; H04W 8/12
See application file for complete search history.

(56) References Cited

U.S. PATENT DOCUMENTS 6,407,988 B1 * 6/2002 Agraharam et al. .......... 370/328
7,190,668 B1 * 3/2007 Francis et al. ................ 370/229
(Continued)

FOREIGN PATENT DOCUMENTS

JP 2001339438 A 12/2001
JP 2002271369 A 9/2002
(Continued)

OTHER PUBLICATIONS

H. Tsuguo et al., "A Study on Mobile IPv6 Based Mobility Management Architecture", Fujitsu Sci. Tech. J., vol. 37, No. 1, Jun. 2001, XP002483264, pp. 65-71.
(Continued)

*Primary Examiner* — Alpus Hsu
*Assistant Examiner* — Hooman Houshmand
(74) *Attorney, Agent, or Firm* — Young & Thompson

(57) ABSTRACT

A method for performing route optimization between two nodes in network based mobility management, wherein each of the two nodes is associated with an access network via attachment to an access router, the access routers having directly or indirectly assigned a Mobility Access Gateway (MAG) that signals the node's presence to a Mobility Anchor (MA) which maintains the current IP address information along with location information of the node, is characterized in that some specific control for setting up a route optimized path for data packet exchange between the two nodes is assigned to the Mobility Anchors (MA).

15 Claims, 3 Drawing Sheets

(51) Int. Cl.
*H04W 8/08* (2009.01)
*H04W 8/12* (2009.01)

(56) References Cited

U.S. PATENT DOCUMENTS

| | | | |
|---|---|---|---|
| 7,929,485 B2 | 4/2011 | Yonezawa | |
| 8,031,674 B2* | 10/2011 | Weniger et al. | 370/331 |
| 2001/0046223 A1* | 11/2001 | Malki et al. | 370/338 |
| 2002/0009066 A1 | 1/2002 | Shimizu et al. | |
| 2002/0147820 A1* | 10/2002 | Yokote | 709/229 |
| 2003/0223422 A1* | 12/2003 | Igarashi et al. | 370/390 |
| 2004/0049532 A1* | 3/2004 | Oka et al. | 709/202 |
| 2004/0196818 A1* | 10/2004 | Iwasaki et al. | 370/338 |
| 2005/0053011 A1* | 3/2005 | Ohbayashi et al. | 370/252 |
| 2006/0018291 A1* | 1/2006 | Patel et al. | 370/335 |
| 2006/0083241 A1* | 4/2006 | Ahluwalia et al. | 370/392 |
| 2007/0218903 A1* | 9/2007 | Grech | 455/436 |
| 2007/0254661 A1* | 11/2007 | Chowdhury et al. | 455/436 |
| 2007/0254677 A1* | 11/2007 | Venkitaraman et al. | 455/458 |
| 2008/0031159 A1* | 2/2008 | Jokinen | 370/255 |
| 2008/0117845 A1* | 5/2008 | Alfano et al. | 370/310 |
| 2008/0130571 A1* | 6/2008 | Maeda | H04L 45/507 370/331 |
| 2008/0176560 A1* | 7/2008 | Dutta et al. | 455/433 |
| 2008/0207206 A1* | 8/2008 | Taniuchi et al. | 455/436 |
| 2008/0298303 A1* | 12/2008 | Tsirtsis | 370/328 |
| 2009/0073935 A1* | 3/2009 | Xia et al. | 370/331 |

FOREIGN PATENT DOCUMENTS

| | | |
|---|---|---|
| JP | 2006254254 A | 9/2006 |
| WO | 2004/010668 | 1/2004 |
| WO | 2007/001953 | 1/2007 |

OTHER PUBLICATIONS

International Search Report dated Jun. 25, 2008, from corresponding PCT application.

Govind Krishnamurthi, Hemant Chaskar, Ritva Siren: "Providing End-to-End Location Privacy in IP-based Mobile Communication", Wireless Communications and Networking Conference, 2004. WCNC. 2004 IEEE, U.S.A., IEEE, Mar. 21, 2004, vol. 2, pp. 1264-1269, 7 page document, with a cover page in Asian.

Japanese Office Action, dated Jul. 12, 2011, in Application No. 2009-553074.

* cited by examiner

METHOD FOR PERFORMING ROUTE OPTIMIZATION BETWEEN TWO NODES IN NETWORK BASED MOBILITY MANAGEMENT

BACKGROUND OF THE INVENTION

The present invention relates to a method for performing route optimization between two nodes in network based mobility management, wherein each of said two nodes is associated with an access network via attachment to an access router, said access routers having directly or indirectly assigned a Mobility Access Gateway (MAG) that signals the node's presence to a Mobility Anchor (MA) which maintains the current IP address information along with location information of said node.

Nowadays, IP-based mobility management protocols, with Mobile IP client functionality residing in the host's/mobile node's (MN) stack, such as Mobile IPv4 or Mobile IPv6, are widely spread. These client-based (or host-based) mobility management architectures require the MN to take care of mobility-related signalling with the corresponding Home Agent (HA).

However, there are several classes of nodes which do not support Mobile IP. Currently, the Internet Engineering Task Force (IETF) is discussing and specifying solutions for network-based localized mobility management (NetLMM), providing mobility to such nodes which do not support any mobility management protocol. Compared to the above mentioned host-based mobility protocols, solutions for network-based mobility management relocate client control functions for mobility management from the mobile node to the network's access router(s).

Besides the provision of mobility to nodes which do not support any mobility management protocol, network-based mobility solutions are envisioned, as they are widely implementation independent and can be employed without significant changes with different access technologies. In contrast, prior art cellular networks imply client-based mobility management and are in general specifically designed for certain kinds of access networks and technologies.

A crucial task in connection with mobility management is the finding and set up of an optimized route for data traffic between two mobile nodes. To support efficient routing of data packets between two MNs, which are under control of a single or different MAs, packets can be routed directly between the associated MAGs instead of traversing always the MAs. For instance, Mobile IPv6 has support for route optimization, to allow data packets travelling a more efficient path between communicating hosts without traversing always the Home Agent (HA). Set up of route optimization in Mobile IPv6 is entirely controlled by the end nodes themselves. On the other hand, Mobile IPv4 makes use of a Home Agent (HA) to initiate setting up direct routes between a MN and a Correspondent Node (CN) in the network. Both solutions consider sending the MN's location information to the CN. In Mobile IPv6, the MN itself sends the location information to the CN, whereas in Mobile IPv4, the Home Agent sends the MN's location information to the CN.

Support for route optimization (RO) in a NetLMM-enabled domain can be achieved similar to how Mobile IPv6 establishes route optimization. Assuming all mobility control has been relocated from the MN to the MAG, the MAG can send signaling to the CN to notify the MN's location. This enables the CN to send data packets directly towards the MN via the associated MAG. The specification for route optimization in known standards, such as for Mobile IPv6, is sufficient to support RO between one MN and one CN. Even support for RO between two MNs is possible. However, efficient support of RO between two MNs in complex mobility scenarios is not yet possible.

SUMMARY OF THE INVENTION

It is therefore an object of the present invention to improve and further develop a method of the initially described type for performing route optimization between two nodes in network based mobility management in such a way that by employing mechanisms that are readily to implement an efficient support of route optimization between two mobile nodes, even in difficult mobility scenarios, is enabled.

In accordance with the invention, the aforementioned object is accomplished by a method comprising the features of claim 1. According to this claim such a method is characterized in that some specific control for setting up a route optimized path for data packet exchange between said two nodes is assigned to said Mobility Anchors.

According to the invention it has been recognized that relying solely on direct signalling between the MAG functions which, in general, are co-located with the infrastructure's access routers, is disadvantageous, in particular in case of the mobile nodes performing handovers. Furthermore, it has been recognized that these problems can be widely avoided by assigning specific control for route optimization to the Mobility Anchors (MA). Insofar, the invention takes advantage of the fact that the Mobility Anchor is the entity in the network which is aware of the MN's location over a rather long time period. For this reason, the invention assigns the Mobility Anchors an essential part in the route optimization process. As a consequence, efficient maintenance of route optimization states is enabled, even in scenarios in which one or even both communicating MNs perform handover to another access router.

The invention provides efficient route optimization (RO) for network-based mobility, and, in particular solves issues associated with RO between mobile nodes, which are under control of different Mobility Anchors. It is to be noted that the invention is not specific to any particular protocol for network-based mobility. Hence, the invention might be applied in connection with, e.g., Proxy Mobile IPv6 or any other NetLMM protocol.

According to a preferred embodiment, one out of the involved Mobility Anchors (MA) is assigned as a dedicated route optimization controller. The thus selected MA coordinates the set up of the route optimized path and associated signalling with the relevant MAGs. Implementing such dedicated control entity by selecting one out of the involved MAs, a main benefit can be achieved in a scenario with multiple MAs, where route optimization is set up between MNs which have different MAs. For instance, consideration of such multi-mobility-anchor scenarios is of particular interest in 3GPP. Moreover, as the RO controller is a dedicated node that takes over full control, race-conditions in RO signalling can be solved.

According to a further preferred embodiment, one out of the involved Mobility Anchors (MA) or another node along the initial communication path between the two mobile nodes is assigned as a route optimization detector. The route optimization detector is responsible for detecting that a route optimized path can be set up between the two MNs.

Advantageously, the detection process carried out by the selected route optimization detector includes a check of the IP addresses of the two communicating mobile nodes in order to determine whether route optimization is possible. Alternatively or additionally, the detection can be based on the IP addresses of the associated MAGs According to a specific embodiment, a setup phase may be provided in which for each pair of communicating mobile nodes the dedicated route optimization controller and/or the route optimization detector are selected. Alternatively, the RO detector may be statically assigned or pre-determined in the network and may not be specific to a pair of MNs. The setup phase may be started when one of the two communicating hosts initiates data traffic towards the other of the two communicating mobile nodes.

More specifically, it may be provided that the assignment of the RO controller and the RO detector is carried out statically. In particular, it may be provided that the RO controller and the RO detector remain the same after once having been selected for a specific pair of communicating hosts. In such case, in which the RO controller assignment is permanent, synchronisation issues between MAs and associated race-conditions in RO-signalling are avoided.

According to another embodiment, the assignment is carried out dynamically. In this case the RO-controller function and/or the RO-detector function are assigned dynamically during the RO setup phase. Optionally, the responsible RO-controller may be re-assigned for an existing route optimization association, which might be beneficial in certain situations, e.g. in case a MN changes its MA. In this connection it has to been noted, that in case one MN or even both MNs move and hand over to different ARs/MAGs, maintenance and reestablishment of route optimization and associated states on the new MAGs is always under control of the MA which has the RO-control function assigned for.

As regards an efficient RO-signalling, it may be provided that as part of the setup phase the selected RO detector triggers the dedicated RO-controller either directly or indirectly to set up a route optimized communication path between a RO association, i.e. between the two communicating MNs. Upon receipt of the RO trigger message, the RO-controller may instruct the receiving node's MAG to exchange information for direct routing and/or addressing with the traffic initiating node's MAG.

According to a preferred embodiment, the signalling for route optimization setup is performed directly between the two nodes' MAGs. In this case a RO setup message is sent from one MAG to the other MAG to activate or update RO forwarding states for the particular RO association.

It is to be noted that for route optimization, all relevant MAGs must share a security association (SA), independent of whether or not they are geographically adjacent. This might impact the amount of SA-related states on each MAG. In case setting up a SA between MAGs appears difficult, the signalling may be preformed in a proxy mode which allows secure operation without mandating such security association. In the proxy mode only MAs exchange signalling with MAGs to setup and maintain RO states. Inter-MAG signalling is not required in a system which operates such proxy mode for route optimization.

As regards a high reliability of the RO setup and maintenance, it may be provided that all signalling messages are acknowledged by means of an associated Ack message. Such messages may carry a status code field indicating safe receipt and proper handling of the involved signalling messages.

As regards the case of a node performing a hand over from one AR/MAG to another AR/MAG it may be provided that the new AR's MAG sends a location update message to the node's MA, which may implement the RO detector function. Based on this information, the RO detector may generate and send a RO trigger message to the RO-controller for updating RO states.

There are several ways how to design and further develop the teaching of the present invention in an advantageous way. To this end, it is to be referred to the patent claims subordinate to patent claim 1 and to the following explanation of preferred examples of an embodiment of the invention, illustrated by the figures. In connection with the explanation of the preferred examples of an embodiment of the invention by the aid of the figures, generally preferred embodiments and further developments of the teaching will be explained.

DESCRIPTION OF PREFERRED
EMBODIMENTS

Figure 1:
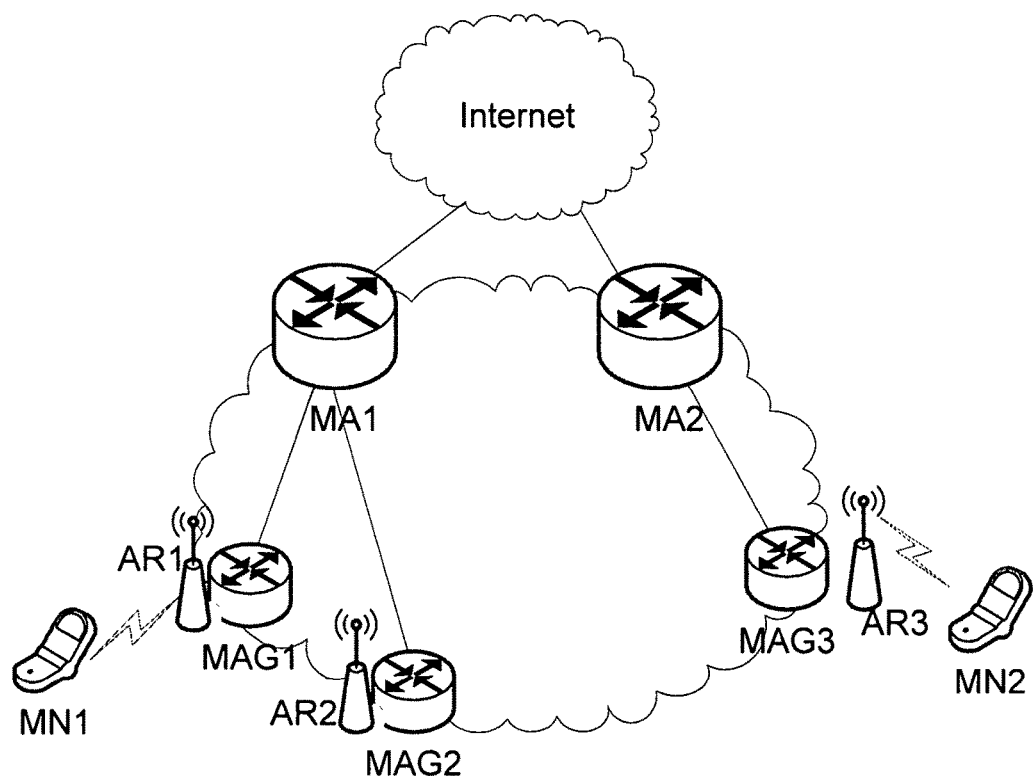
FIG. 1 illustrates an example of an application scenario of an embodiment of the present invention in network-based mobility management.

With reference to FIG. 1, an architecture for network-based mobility management is illustrated in which the present invention may be applied. More specifically, FIG. 1 shows a network domain with—exemplarily—a total of three access routers AR each of which has assigned a functional MAG (Mobility Access Gateway). Access routers AR1 and AR2 and the associated Mobility Access Gateways MAG1 and MAG2, respectively, are under control of a Mobility Anchor which is designated MA1. On the other hand, access router AR3 (and the associated Mobility Access Gateway MAG3, respectively) is under control of another Mobility Anchor, designated MA2. The Mobility Anchors maintain the current IP-locations of MNs registered with MAGs which have selected the respective MA.

In the embodiment shown in FIG. 1, a mobile node labelled MN1 is attached to access router AR1. As soon as corresponding MAG1 learns about the attachment of MN1, it registers MN1 with a selected Mobility Anchor—MA1—by means of mobility-related signalling. From now on, MA1 forwards downlink data packets for MN1 to MAG1, typically by means of tunnelling. The MAG forwards the packets to the MN. Uplink data packets, which are sent by MN1, are forwarded from MAG1 to the selected MA1. MA1 forwards the data-packets. Another host—MN2—is attached to MAG3 and registered with MA2.

When MN1 initiates traffic towards MN2, the data packets are routed via MN1's MAG (MAG1), MA1 and MA2. Either, MAG1 or MA1 can detect that a route optimized path can be set up between the two communicating hosts MN1 and MN2. As an example, detecting can be based on the two MNs' IP addresses and/or on the associated MAGs' IP addresses. Accordingly, either MAG 1 or MA1 takes over the role of a route optimization (RO) detector. In the case shown in FIG. 1, MA1 gets assigned as RO-detector.

During a setup phase of the route optimized path, either MA1 or MA2 will be selected as active RO-controller for that particular RO association (between MN1 and MN2). In case both MNs are registered with the same MA, this single MA will serve as RO controller. The MA, which has the active RO controller function assigned, coordinates the setup of a route optimized path and associated signalling with the relevant MAG(s).

After the route optimized path has been set up between the two MNs' MAGs, one or both MNs might hand over to a different AR/MAG. In that case, the MA, which serves as active RO-controller for this particular RO association, coordinates the re-signalling to setup and maintain RO states for that particular pair of MNs.

Figure 2:
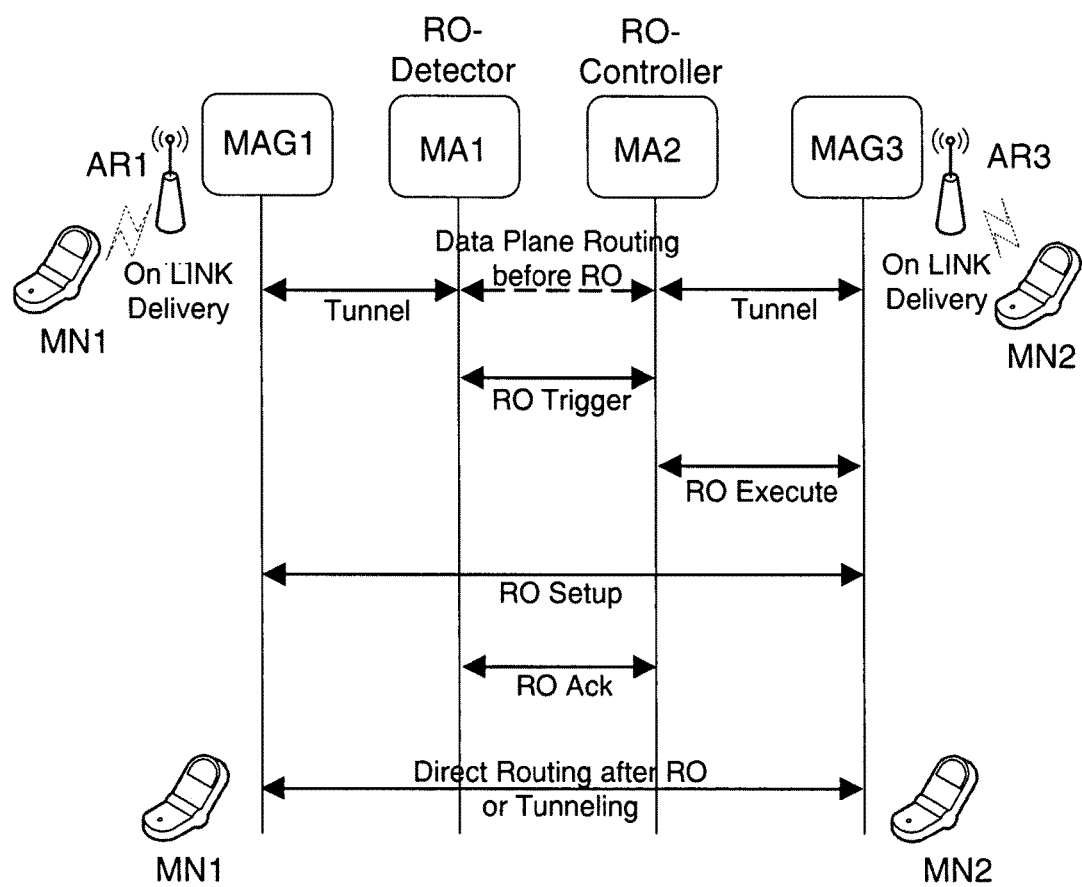
FIG. 2 illustrates an example of a route optimization procedure setup according to an embodiment of the present invention.

FIG. 2 shows the RO procedure setup between hosts MN1 and MN2 of FIG. 1 in some more detail. As mentioned already in connection with the description of FIG. 1, in a setup phase Mobility Anchor MA1 has been assigned as RO-detector, whereas Mobility Anchor MA2 has been assigned as RO-controller. In an initial situation data traffic initiated by mobile node MN1 is delivered on link from the node to AR1/MAG1, between MAG1 and MA1 an IP-tunnel is established, between MA1 and MA2 data plane routing may be performed, and finally, between MA2 and MAG3, which is the functional MAG of the receiving MN2's access router AR3, again an IP-tunnel is established.

MA1 as selected RO-detector detects the possibility to set up a route optimized path for this communication. However, MA1 is not aware of the IP address of MAG3. Consequently, MA1 sends a RO trigger message to MA2, which carries information about MAG1's IP address, MN1's ID and Home Network Prefix as well as the Home Network Prefix of MN2. Upon receipt of this trigger message, the assigned RO-controller, in this case MA2, sends an RO execute message to MAG3, instructing MAG3 to create forwarding states for the setup of a route optimized path and to exchange information with MAG1 needed for direct communication. Upon receipt of the RO execute message, MAG3 sends a RO setup message to MAG1, carrying the IDs of MN1 and MN2, as well as the Home Network Prefix of MN2. RO states are now established on MAG1 and MAG3. The result of the setup is reported to the RO controller, i.e. to MA2, by means of a RO report message. In a final step MA2 informs MA1, who triggered route optimization, of the procedure's result, which is done by means of the RO Acknowledgement message. From then on, data exchange between MN1 and MN2 can be performed by means of direct routing or tunnelling.

Figure 3:
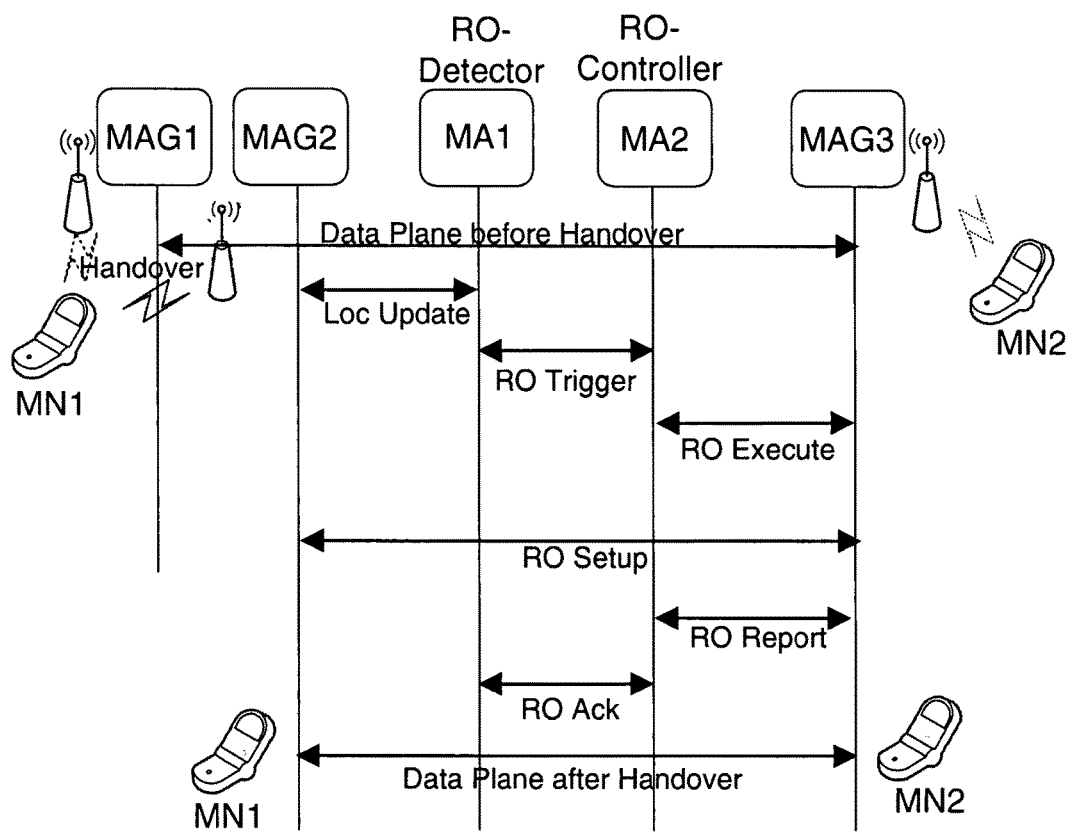
FIG. 3 illustrates an example of a route optimization procedure update upon a handover according to an embodiment of the present invention.

FIG. 3 shows the RO procedure update upon handover between the hosts MN1 and MN2 of FIG. 1 in some more detail. Specifically, MN1 performs handover from AR1/MAG1 to AR2/MAG2. This handover results in MAG2 sending a location update message to MA1. When MA1 receives the location update message from MN1's new MAG, i.e. MAG2, it knows that RO states at MAGs need to be updated at MAG3 and established at MAG2. In addition, RO states should be deleted at MAG1.

Upon receipt of the location update message by MA1, it sends a RO trigger message to MA2 assigned as permanent RO-controller. Thenceforward, the further signalling is the same as described in connection with FIG. 2.

Mobility signalling as described in connection with FIGS. 2 and 3 requires direct signalling between the involved MAGs as the RO setup message is exchanged directly between these two functional entities. However, in certain scenarios such direct signalling between the involved MAGs may be prohibited or at least unfeasible. In such cases it is possible to perform mobility signalling not in a direct mode (as shown in FIG. 2 and FIG. 3), but in a so-called proxy mode. In this mode inter-MAG signalling is not required. Instead, after MA1 having sent the RO-trigger message to MA2 to request setting up RO states between MAG2 and MAG3 and MA2 having established RO states at MAG3 by means of the RO execute message, MA2 notifies MA1 about the created RO states at MAG2 by means of a RO report handshake. The result causes MA1 to proxy the RO setup message, which is sent to MAG 2. MAG2 has now all RO states setup and activated, whereas MAG3 waits for the RO setup from MA2 to activate its states according to MAG2's status.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for performing route optimization between two mobile nodes in network based mobility management, the method comprising:
    including two mobile nodes in a network-based mobility management network, where each of the two mobile nodes is registered with a different one of two Mobility Anchors (MA) in the network, and where each of the two Mobility Anchors has a control function for finding, setting up, and maintaining a route optimized path between the two mobile nodes;
    associating the two mobile nodes with an access network via attachment to a respective different one of two access routers, each of said access routers being assigned to a respective different one of two Mobility Access Gateways (MAG) that each signals a respective Internal Protocol (IP) address and location of a respective one of the two mobile nodes to the respective one of the two Mobility Anchors;
    providing each of said two Mobility Anchors with the control functions for finding and setting up the route optimized path for data packet exchange between said two mobile nodes and for maintaining localized routing states, wherein the route optimized path for data packet exchange is a direct routing that does not traverse said two Mobility Anchors; and
    assigning one of said two Mobility Anchors as a dedicated route optimization controller that coordinates finding, setting up, and maintaining communication route optimization between said two mobile nodes and associated signaling with the relevant Mobility Access Gateways.

2. Method according to claim 1, wherein one of said two Mobility Anchors (MA) or another node along the initial communication path between said two mobile nodes is assigned as a route optimization detector.

3. Method according to claim 2, wherein said route optimization detector checks the IP addresses of said two mobile nodes to determine whether route optimization is possible.

4. Method according to claim 2, wherein said route optimization detector triggers said dedicated route optimization controller to find and set up a route optimized communication path between said two mobile nodes.

5. Method according to claim 4, wherein said dedicated route optimization controller, upon receipt of said trigger, instructs the receiving mobile node's Mobility Access Gateway (MAG), to exchange information with the other of said two Mobility Access Gateways for direct routing/addressing.

6. Method according to claim 2, wherein for each pair of communicating mobile nodes, said route optimization detector is selected during a setup phase.

7. Method according to claim 1, wherein for each pair of communicating mobile nodes, said dedicated route optimization controller is selected during a setup phase.

8. Method according to claim 1, wherein the assigning step is carried out statically.

9. Method according to claim 1, wherein said dedicated route optimization controller remains the same after once having been selected for a pair of communicating mobile nodes.

10. Method according to claim 1, wherein the assigning step is carried out dynamically.

11. Method according to claim 10, wherein for each pair of communicating mobile nodes, said dedicated route optimization controller is reselected for an existing route optimization association between two nodes.

12. Method according to claim 1, wherein the signaling for route optimization setup is performed directly between said two Mobility Access Gateways (MAG).

13. Method according to claim 1, wherein the signaling for route optimization setup is performed in a proxy mode with involvement of said two Mobility Anchors (MA).

14. Method according to claim 1, wherein all signaling messages are acknowledged by means of an associated Ack message carrying a status code field.

15. Method according to claim 1, wherein a location update message generated in case of a mobile node performing a handover from one access router to another access router serves as indication to update associated route optimization states under control of the dedicated route optimization controller.

* * * * *